United States Patent [19]

Hobbs et al.

[11] Patent Number: 5,189,965
[45] Date of Patent: Mar. 2, 1993

[54] GRANULAR MATERIALS APPLICATOR

[75] Inventors: Kent M. Hobbs; Johnathan I. Macy, both of Holdrege, Nebr.

[73] Assignee: Holdrege Seed and Farm Supply Company, Holdrege, Nebr.

[21] Appl. No.: 517,940

[22] Filed: May 2, 1990

[51] Int. Cl.⁵ .................. A01C 15/04; A01C 7/00
[52] U.S. Cl. .................. 111/178; 111/177; 111/174; 222/368; 222/626; 222/52; 222/71
[58] Field of Search .......... 111/174, 170, 177, 178, 111/181, 900, 903, 904; 222/368, 613, 63, 626, 288, 52, 71

[56] References Cited

U.S. PATENT DOCUMENTS

| | | | |
|---|---|---|---|
| 3,758,004 | 9/1973 | Garrett et al. | 222/368 |
| 4,379,664 | 4/1983 | Klein et al. | 111/174 |
| 4,392,587 | 7/1983 | Bourne . | |
| 4,408,704 | 10/1983 | Stelen | 111/177 |
| 4,705,220 | 11/1987 | Gandrud et al. | 222/317 |
| 5,003,894 | 4/1991 | Lafferty | 111/178 |
| 5,024,173 | 6/1991 | Deckler | 111/178 |
| 5,024,356 | 6/1991 | Gerling et al. | 222/312 |
| 5,025,951 | 6/1991 | Hook et al. | 111/177 |

FOREIGN PATENT DOCUMENTS 2521619 10/1976 Fed. Rep. of Germany ...... 111/174

OTHER PUBLICATIONS

Hiniker Computer Sean Brochure, Feb.-1979.
"Beline CC5 Manual Installation and Operating Instructions," Beline Manufacturing Company Limited (Mar. 1985).
"Beline Computaire Applicator Installation and Operating Instructions," Beline Manufacturing Company Limited (Aug. 1984).

*Primary Examiner*—Randolph A. Reese
*Assistant Examiner*—Spencer Warnicke
*Attorney, Agent, or Firm*—Lee, Mann, Smith, McWilliams, Sweeney & Ohlson

[57] ABSTRACT

A granular materials applicator is disclosed in which controlled metering rolls rotating at a preselected angular velocity provides volumetric displacement of the granular material irrespective of varying operating conditions.

7 Claims, 6 Drawing Sheets

GRANULAR MATERIALS APPLICATOR

The present invention relates to apparatus and methods for applying granular materials in agricultural and industrial operations. In particular, the invention provides a controlled volumetric displacement of the granular material intended to be discharged at a predetermined rate of application regardless of variable operating conditions.

BACKGROUND OF THE INVENTION

Proper treatment of agricultural crops has long been recognized as having an important and direct effect on the healthy emergence and maintenance of the crops. It is therefore a common agricultural technique to discharge granular agricultural treating agents, such as pesticides, herbicides, fertilizer and the like, to control pests, weeds and various fungi which may otherwise damage or even ruin the crops. The application of such chemicals, however, should be accurately and uniformly distributed over the area intended to be applied. This is particularly true of chemicals which are selective in their action. For example, excessive application in any given area results in the loss of expensive chemicals and may lead to crop loss. Moreover, such application may have an adverse environmental impact. Of course, insufficient application results in the lack of adequate treating agent; thus, for example resulting in inadequate pest control.

In addition, it is desirable to control application of such treating agents to account for various concentrations of granular material intended to be applied and in consideration of varying operating conditions. For example, in some applications, it is desirable to apply the material to preselected areas of the crop only. Further, the rate of delivery, i e., the output of the treating agent over a given unit of time, must be easily adjusted to account for variations in the crop and in the soil type and in the terrain as well as variations in the speed of applicating equipment.

Previously proposed granular materials applicators typically operate with the use of an auger that rotates for removal of the granular material, or apertures closed by slide valves of the type found in small commercially available lawn fertilizers, or even brushes extending into a hopper containing the granular material. In some of the devices, material flows from a hopper to form piles which are thereafter discharged. The tops of the piles may, for example, be displaced into channels leading to spreaders by a reciprocating rod extending the length of the hopper and studs or washers on the rod. The result, however, is cyclical output. Moreover, on rough terrain, the piles forming in the hopper tend to become displaced or are inadvertently dispensed which may cause over-application or wasting of expensive chemicals.

Other known applicators include trapdoor type devices extending the length of the hopper for rocking back and forth to open one side of the hopper and then the other. Such rocking results in intermittent output. In addition, metering devices placed inside the hopper tend to pulverize the granular material, causing compaction within the hopper and reduced feed through the discharge orifices.

Still other applicators provide control for the granular material flow rate with the use of rotating wheels spaced from respective orifices at the base of a hopper. In one arrangement of this type, a rotating wheel is driven with the use of a variable speed electric motor and feedback circuitry to maintain a constant angular velocity of the metering wheels, from which the application rate may be manually adjusted. However, inasmuch as the metering wheels are spaced from the hopper orifice, the system may inadvertently dispense material. Moreover, manual adjustment for changing conditions renders this arrangement somewhat inflexible.

Thus, while prior art applicating systems may function satisfactorily under certain conditions, they are susceptible to irregular and uneven material application, particularly when operating at high rates of speed or over great periods of time. As a result, the material will not be distributed as evenly as intended. Moreover, many of the known material applicators are not capable of accommodating various topologies and continuously variable operating conditions. Further, the known systems do not easily accommodate changes in the type of material or the amount of material desired to be dispensed.

SUMMARY OF THE INVENTION

Accordingly, a general object of the present invention is to provide an improved granular materials applicating system that overcomes the deficiencies of the prior art.

Similarly, it is an object of the present invention to provide a granular materials applicator that ascertains the volumetric output for a particular application in accordance with the desired application rate.

An additional object of the present invention is to provide an applicating system capable of uniformly discharging a predetermined volume of granular material and with precision.

It is another object of this invention to provide a new and unique method for controlling the rate of discharge of granular material to compensate for continuously variable operating conditions.

Other objects and advantages of the invention will become apparent upon reading the following description and appended claims, and upon reference to the accompanying drawings.

These objects are accomplished in a granular materials applicator that volumetrically extracts the granular material in accordance with a preselected application rate in a controlled operation. The apparatus thereafter uniformly applies the material at a desired location with the use of vacuum means to provide an efficient and cost effective application.

The granular materials applicator comprises a hopper for holding the material, a pneumatic delivery system for uniformly applying the material, metering rolls for directing the material from the hopper to the pneumatic delivery system at a predetermined volumetric rate, metering drive means, and a logical controller. According to the invention, a plurality of metering rolls are fixed about a common axis of rotation and spaced from an orifice formed in the base of the hopper. Upon rotation of the metering rolls, a predetermined volume of the granular material is received in equispaced pockets formed around the circumference of the metering rolls. The controller provides appropriate signals to drive the metering roll axis of rotation at a predetermined angular velocity. In this way, the metering rolls supply a known amount of granular material to the pneumatic delivery system. The pneumatic delivery system thereafter dispenses the granular material at a uniform rate to predetermined dispensing locations.

The invention uses microprocessor control for providing signals to actuate the metering drive means of the system at a desired rotational speed. The microprocessor receives sensing signals indicative of the ground velocity of the system as well as sensing signals indicative of the angular velocity of the drive metering means and provides a compensation signal to the drive means. In addition, the microprocessor receives input information from the operator relative to the desired application rate as well as other desired operating parameters. From this information, the microprocessor operates to control the output of the drive means.

BRIEF DESCRIPTION OF THE DRAWINGS

For a more complete understanding of this invention, reference should now be made to the embodiments illustrated in greater detail in the accompanying drawings, and described below by way of example of the invention.

In the drawings.

The following detailed description will permit a more complete understanding of this invention. However, the embodiments described below are simply examples of the invention and the invention is not limited to these embodiments. Furthermore, the drawings are not necessarily to scale and certain elements may have been omitted which are not necessary for an understanding of the invention, including details of fabrication and assembly.

DETAILED DESCRIPTION OF THE PREFERRED EMBODIMENT

Generally, the present invention relates to an apparatus and method for metering granular materials at a preselected volumetric rate and then uniformly discharging the material at a preselected location independent of variable operating conditions. The device of this invention is intended to be integrated into an agricultural operation using herbicides, pesticides and fertilizers, or any other operation in which precise control of metering and dispensing granular material is desirable. Therefore, it should be understood that the words "granular materials" are used in the broadest possible sense to include any granular material, such as fertilizer, agricultural chemicals, or small, hard seed such as alphalpha or millet in a planting application. In addition, "granular materials" may be construed to mean granular salt used in a snow or ice removal application, or other material that can advantageously be handled as described hereinafter.

Figure 1:
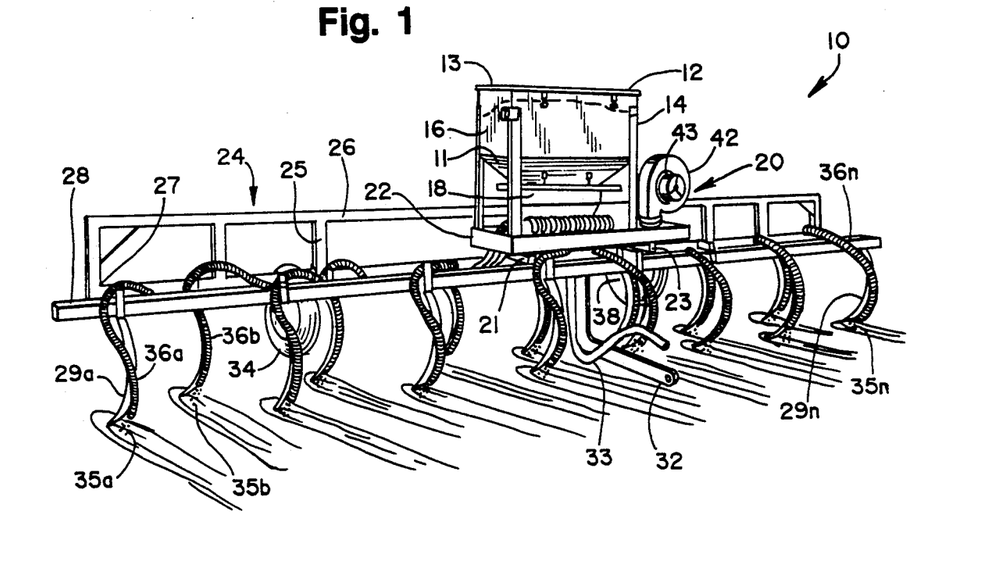
FIG. 1 is a perspective view of an illustrative embodiment of the granular materials applicator embodying principles of this invention.
Figure 2:
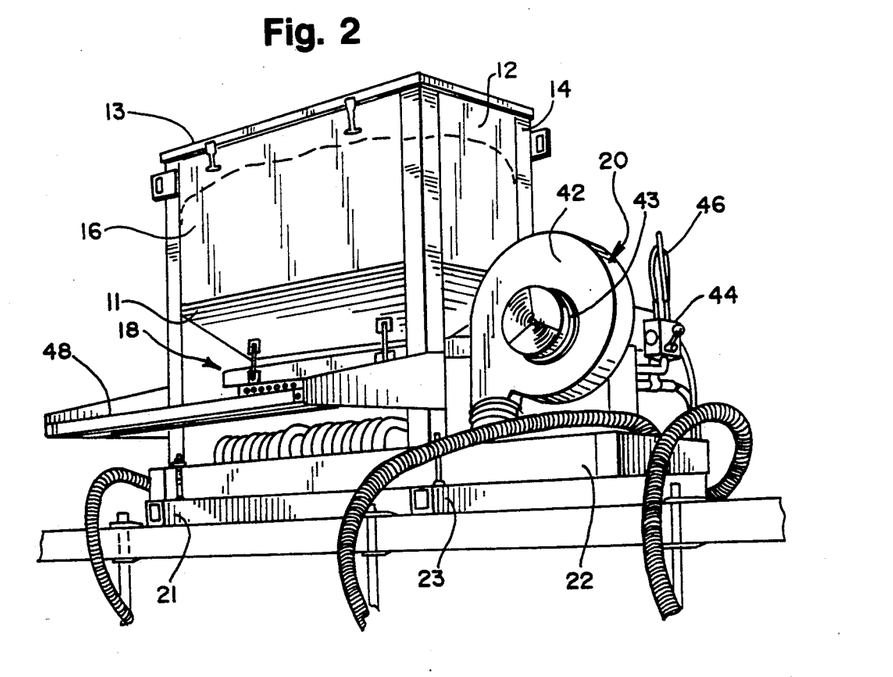
FIG. 2 is a perspective view of the present invention showing the hopper and pneumatic delivery system of the apparatus of FIG. 1 in greater detail.

FIGS. 1 and 2 show perspective views of the granular materials applicating system of the present invention including a granular materials handling apparatus 10. The materials handling apparatus 10 includes a hopper 12, preferably fabricated of stainless steel, for storing granular material 16 intended to be discharged. The hopper 12 has a gradually tapered section 11 so that the granular material 16 flows to the bottom upon the force of gravity. A sensor (not shown) resident in the hopper 12 provides a signal on a line 146 (FIG. 9) indicative of the presence of granular material in the hopper 12 as is well known in the art. An aperture (shown in FIG. 5 as numeral 84) formed in the base of the hopper 12 passes the granular material to the metering and dispensing systems 18 and 20 for subsequent application of the material. Preferably, the hopper 12 also includes a lid 13 for closure thereof to prevent spillage or possible contamination of the granular material. The hopper 12 is secured to a support base 22 of the system with four vertical standards, one of which is shown as standard 14.

The support base 22 is rigidly mounted to a support frame 24 by support members 21 and 23. The support frame 24 includes a first longitudinally extending support bar 26 and a second longitudinally extending support bar 28, spaced from the first support bar 26. A plurality of transverse and lateral support members such as support members 25 and 27 interconnect the first and second longitudinal support bars 26 and 28. Spaced fingers 29a through 29n are interconnected to the first and second longitudinal support bars 26 and 28. The spaced fingers 29a through 29n define multiple dispensing points 35a through 35n for application of the material to the crops or to the soil. A hitch 32 as well as a hydraulic linkage 33 attach to a tractor unit (not shown) for pulling the materials handling apparatus 10.

The materials handling apparatus 10 includes a pair of freely rotatable wheels 34 and 38 rotatably mounted to the support frame 24 for easy pulling of the materials handling apparatus 10. In addition, a multi-purpose tray 48 (FIG. 2) may be secured to the vertical standards 14 for convenient placement of hand tools or bags of material intended to be placed within the hopper 12.

A metering system 18 is interconnected with the base of the hopper 12 in communication with the hopper orifice (numeral 84 in FIG. 5) and provides a preselected volumetric amount of granular material to a pneumatic delivery system 20. The pneumatic delivery system 20 comprises a blower assembly 42 that uniformly supplies measured quantities of granular material received from the metering system 18 to a plurality of delivery hoses 36a through 36n. The delivery hoses 36a through 36n are lead along the spaced fingers 29a through 29n for uniformly distributing the material to multiple dispensing points. It will be appreciated that the spaced fingers 29a through 29n may terminate with deflection tool portions 35a through 35n to assure proper uniform distribution of the material. In the preferred embodiment, sixteen multiple dispensing points are staggered as well as spaced apart from each other for dispensing the granular material at its intended location. Of course, it will be understood that any number of delivery hoses and corresponding dispensing points may just as easily be utilized according to the invention.

As best seen in FIG. 2, the delivery system 20 of the materials applicator 10 includes a blower assembly 42 secured to the support base 22. In the preferred embodiment, the blower assembly 42 operates with an output capacity of 20 ounces per square inch and discharges 100 lbs. per cubic foot density of material up to 40 feet in one direction. The blower assembly 42 comprises a fan 43 which operates at 3200 revolutions per minute (rpm). The blower assembly 42 is preferably driven by a hydraulic motor (not shown) and is controlled by a hydraulic control mechanism 44, operatively interconnected to the blower assembly 42 with the use of appropriate hosing 46, as is well known to those skilled in the art. In addition, a sensor (not shown) provides a signal on a line 144 (FIG. 9) indicative the blower assembly 42 is operating as is well known in the art.

Hydraulic power for the blower assembly 42 is supplied from the tractor unit via the hydraulic linkage 33. However, it will be appreciated that in different applications wherein smaller pulling units are implemented, sufficient hydraulic power cannot be supplied to the blower assembly 42. Accordingly, a stand-alone gasoline motor may just as easily be mounted on the apparatus 10 to operate the blower assembly 42. An example of such an arrangement is for the application of fertilizer on a golf course.

Figure 3:
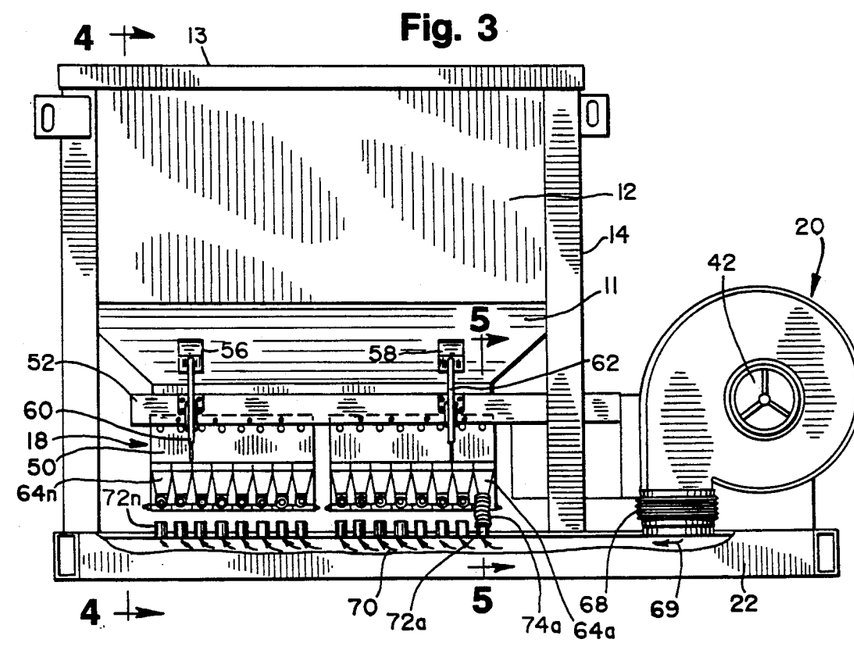
FIG. 3 is a section view of the granular materials applicator of FIG. 1 showing the metering system of the present invention for one application.

In FIG. 3, a section of the metering system 18 as well as the delivery system 20 of the present invention is illustrated. The blower assembly 42 has an outlet channel 68 enclosed with appropriate hosing. The outlet channel 68 is in communication with an air delivery manifold 70 formed in the support base 22 which receives the air flow in the direction denoted by the arrow 69 induced by the blower assembly 42. The manifold 70 comprises individual outlets 72a through 72n from which inlet hoses such as hose 74a interconnect to respective material injector inlet nozzles such as nozzle 66a (see FIGS. 5 and 6) of the metering system 18. It will be appreciated that selected amounts of granular material are applied from individual channels of the metering system 18 to the material injectors 64a through 64n. Thereafter, delivery hoses 36a through 36n (FIG. 1) supply the granular material to the appropriate dispensing point.

Figure 4:
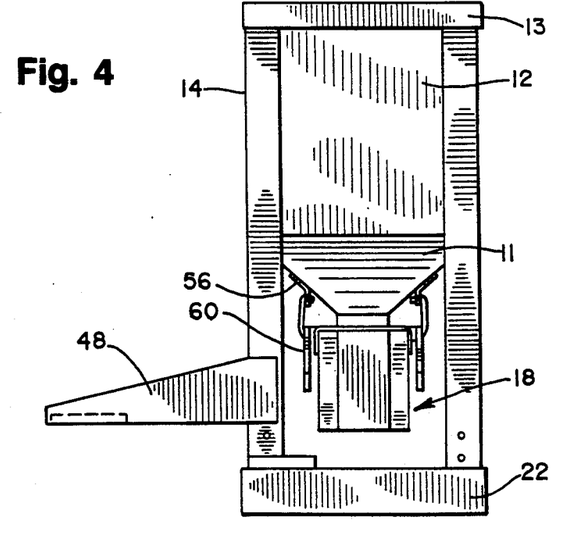
FIG. 4 is a section view of the hopper and delivery system of FIG. 3 taken along the lines 4—4.

FIG. 3 also show the metering system 18 comprising a channel cover plate 50 which is secured to a support member 52 of the metering system 18. The channel cover plate 50 encloses sixteen partitioned metering and delivery channels in the preferred embodiment wherein a selected volume of granular material is measured. Thereafter, the material from each metering channel is supplied to the plurality of granular material injectors 64a through 64n. The injectors terminate with nozzles having an inlet sections 66a through 66n which define part of the pressurized air delivery system 20. As best seen in FIGS. 3 and 4, mounting brackets 56 and 58 are positioned on the hopper 12 to receive actuatable lever clamps 60 and 62 of the metering system 18. In this way, the metering system 18 may be easily assembled to or removed from the hopper 12 as a complete unit for cleaning or maintenance.

Figure 5:
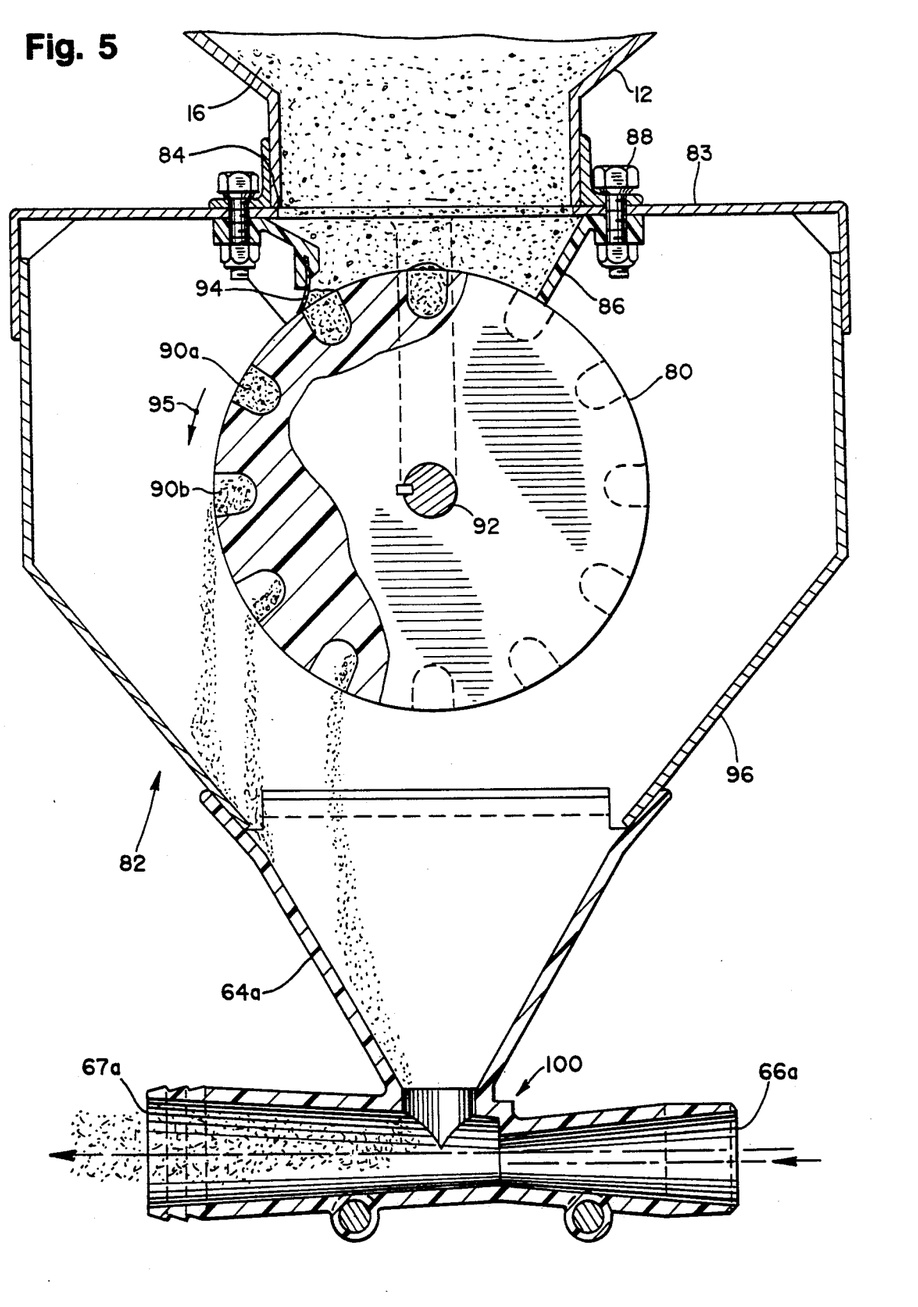
FIG. 5 is a section view of the metering system of the materials applicator of FIG. 3 taken along the lines 5—5.
Figure 6:
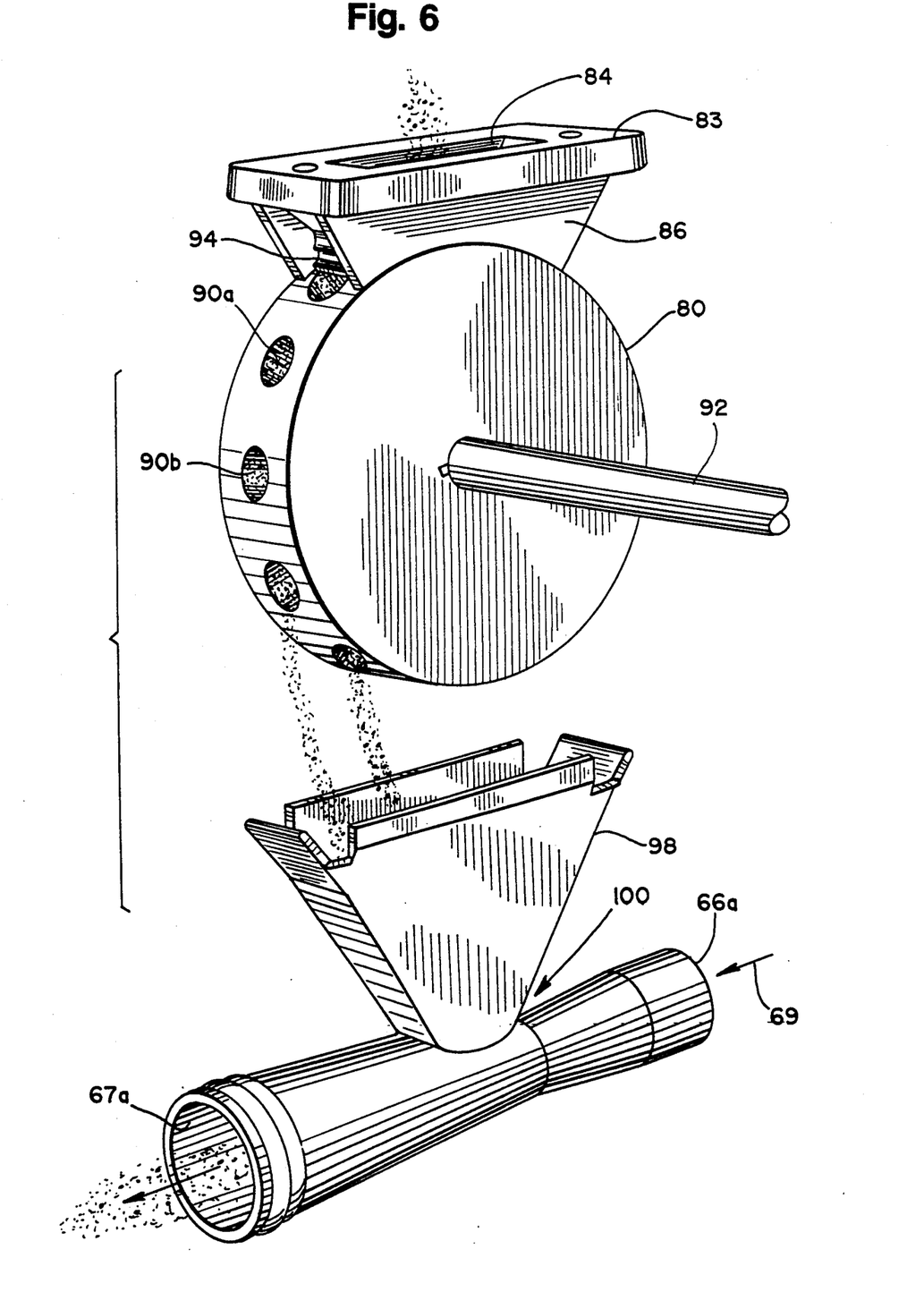
FIG. 6 is a perspective view of the metering system of FIG. 4.

FIG. 5 and FIG. 6 show an individual metering roll or wheel 80 within an individual channel extension assembly 82. A singular metering channel is defined by a channel cover 83 as well as channel sidewalls 96. As shown in FIG. 5, the aperture 84 formed in the base of the hopper 12 provides granular material 16 to the metering channel. A metering wheel feed chute enclosure 86 encloses the hopper aperture 84 and is secured to the channel cover 83 with the use of securing screws, one of which is shown as securing screw 88. In addition, a cantilevered leveling knife 94 is secured to the metering wheel feed chute 86. It will be appreciated that this arrangement provides an enclosure for the introduction of granular material to the metering wheel 80.

The metering wheel comprises equispaced impressions or pockets 90a through 90n formed about its circumference.

The pockets are cylindrically shaped internally with convex bottom ends and are located intermediate and spaced from each of the sides of the metering wheel, as shown in FIGS. 5 and 6. In the preferred embodiment, twelve spaced pockets having a radial dimension of approximately 0.4 inches are spaced about the circumference of the metering wheel 80. Advantageously, the equispaced pockets 90a through 90n define a preselected volume. In addition, metering wheel 80 is driven by a shaft 92 at a predetermined angular velocity. FIGS. 5 and 6 also show the leveling knife 94 which levels the amount of granular material placed within the metering pockets 90a through 90n. In this way, a predetermined volume of material is displaced by the metering wheel 80 and drops into the delivering channel upon rotation of the metering wheel 80.

The desired application rate, in pounds of material per acre, as well as the known density of the granular material, determines the appropriate volumetric displacement rate of the metering system 18. The following equation represents this relationship:

$$\text{Application Rate} \left[ \frac{\text{lbs}}{\text{acre}} \right] = \text{Density} \left[ \frac{\text{lbs}}{\text{ft}^3} \right] \times \text{Volumetric Displacement} \left[ \frac{\text{ft}^3}{\text{acre}} \right]$$

The metering system provides a volumetric displacement of granular material to obtain the desired application rate according to this relationship.

It will be appreciated that in some instances, extreme volumes of material will be extracted from the hopper 12. In other applications, for example when highly concentrated treating agents are used, significantly less volumes of material will be required. The present invention therefore provides metering roll pockets 90a through 90n of varying sizes to allow for flexibility in application rates as well as required metering rates. For example, in a fertilizer application, large quantities of material are necessarily dispensed in relatively short period of time. In this application, the installation of metering rolls having larger pockets provides ease of use. On the other hand, in an application where a highly concentrated chemical material is used, metering rolls having small pockets are installed for accurate control and measurability.

FIG. 5 also shows the metering channel sidewalls 96 that enclose the metering operation are connected with a V-shaped material injector 64a. As the material drops out of the metering pockets 90a through 90n, the injector 64a 100 for dispensing of the material. The channel outlet port 100 comprises a nozzle-like converging inlet cone 66a which introduces the pressurized air stream provided by the blower assembly 42. Inasmuch as the air stream passing relative the channel outlet port 100 is pressurized, a vacuum is created which uniformly draws the material therein and dispenses the material through the outlet nozzle 67a. The material is thereafter distributed to the dispensing points via hoses 36a through 36n (FIG. 1) which connect to respective outlet nozzles 67a through 67n. All of the sixteen metering rolls and channel assemblies are constructed and function in exactly the same manner.

The use of such a metering and delivery system accommodates a broad range of granular structures and densities. In addition, a varying range of application rates may be used without loss of application precision. For example, the apparatus 10 is capable of metering and dispensing 2.2 lbs. of material having a 90 lbs/ft$^3$ density at the low end, and up to 150 lbs. of material having an 88 lbs/ft$^3$ density. This range represents approximately a 7:1 application ability ratio as will be appreciated by those skilled in the art.

Figure 7:
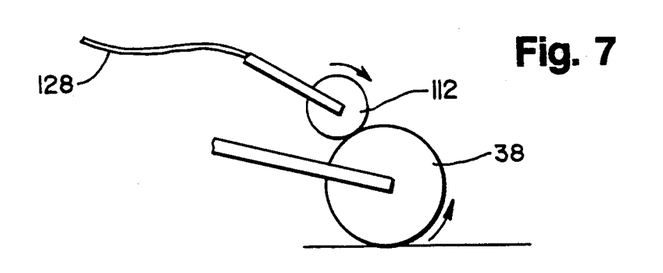
FIG. 7 is a section view of a ground speed sensing wheel in contact with a ground wheel according to the present invention.

FIG. 7 shows a ground speed sensing mechanism used by the present invention. A sensing wheel 112 contacts the ground wheel 38 of the materials handling apparatus 10. Accordingly, the sensing wheel 112 will rotate with the same angular velocity as the ground wheel 38. A speed sensor (not shown) detects the speed of the sensing wheel 112 via line 128 and thereafter provides a signal indicative of the speed of the sensing wheel, and of course, the speed of the ground wheel to a microprocessor 120 on a line 124. In this way, information on the ground speed of the materials handling apparatus 10 may be determined. Of course, other speed sensing apparatus and methods will occur to those skilled in the art and will work just as well.

It will be appreciated that various specific control systems may be utilized in practicing this invention. By way of example, FIGS. 8-9 illustrate systems using a microprocessor 120 for automatically maintaining a desired angular velocity of the metering wheels based on the desired application rate and ground speed selected by the operator.

Figure 8:
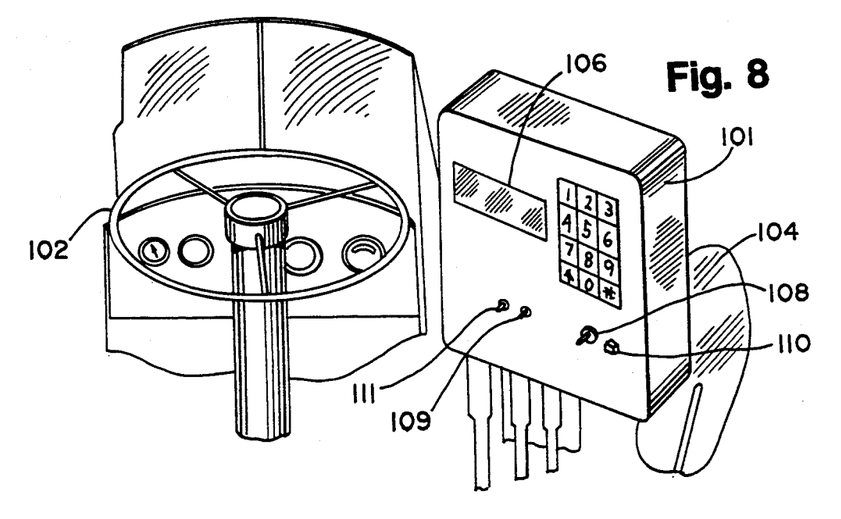
FIG. 8 is a perspective view of the operator's position, showing a control box of the apparatus in relation thereto.
Figure 9:
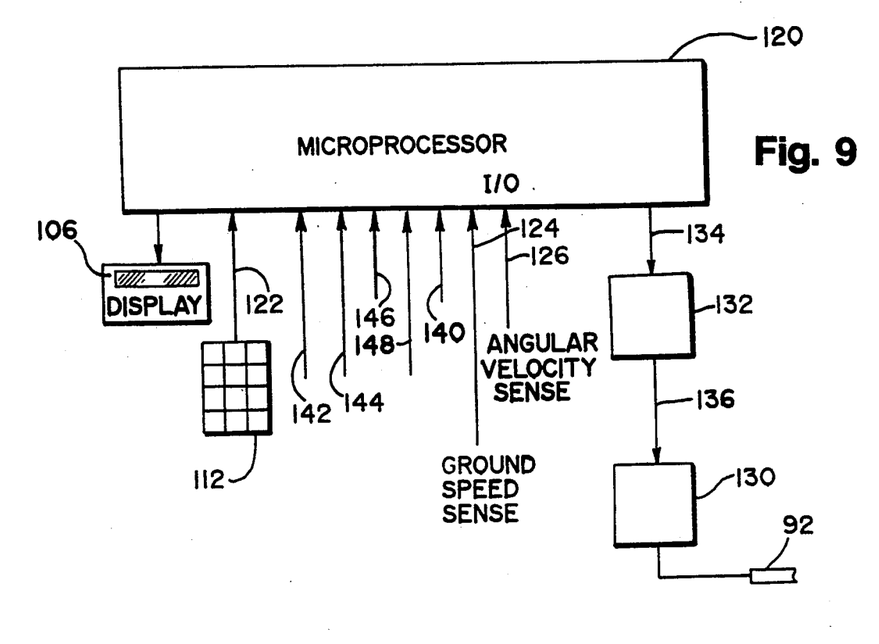
FIG. 9 is a block diagram of the microprocessor control system of the granular materials applicator according to the present invention.

A control box 101 shown in FIG. 8 is of such size and dimension as to be easily fit and securely mounted between the operator's steering controls 102 and an adjacent tire fender 104. The control box 101 is secured to a post 106 which is preferably mounted to the tractor at position easily accessible to the operator. Of course, placement of the control box 101 in other arrangements will work just as well.

The control box of FIG. 8 has a display 106 which displays information upon applying power to the control box via an on-off switch 108. In the preferred embodiment, an LED 110 indicates that the control box 101 is receiving power. A signal on the line 140 (FIG. 9) also is provided to indicate power being supplied. A system on-off switch 111 is placed to the "on" position for applying power to the apparatus 10. In this position a signal indicative of power being supplied to the apparatus 10 is also supplied to the microprocessor 120 on a line 142 (FIG. 9). The control box also has an input keyboard 112 which allows information to be input to the system microprocessor in accordance with the menu-driven display 106. In this way, the operator easily adjusts the system parameters to a desired application.

In addition, a switch 109 on the control box 101 is positioned to operate the system in a "booster" mode described in greater detail below. In this mode, the system outputs a maximum quantity of granular material.

Turning now to FIG. 9, therein is shown a block diagram of the control system for the materials applicator incorporating a microprocessor as illustrated schematically at 120. In the preferred embodiment, the microprocessor is the 8052AH manufactured by Intel Corporation. However, other microprocessors which are capable of performing the desired operations could be used. Preferably, the microprocessor configuration supports 8 k of static RAM, 32 k of ROM, two programmable interfaces, an A/D converter, and an alphanumeric LCD screen driver. The microprocessor 120 receives input control signals from the keyboard 112 at the line 122 as well as a sensing signal at the line 124 corresponding to the ground speed of the system. In addition, the microprocessor 120 receives a signal at a line 126 corresponding to the sensed angular velocity of the DC motor 130. The sensing of the ground speed and angular velocity can be accomplished in any well known manner. From these, the microprocessor 120 operates in a logical fashion providing appropriate control signals to an output motor driver board 132 on a line 134.

Upon receipt of the digital control signals provided by the microprocessor 120, the motor driver board 132 provides appropriate circuitry for converting the control signals to pulse width modulated signals, as is known to those skilled in the art. Appropriate pulses having a constant repetition rate and a duty cycle relative to the digital control signals are provided at an output line 136 to the DC motor 130. Providing control pulses to the DC motor 130 in this manner allows precise linear control of the motor 130 over the full range of available speeds. Preferably, the motor driver board 132 is capable of handling up to 15 ampere of continuous load.

In addition, appropriate switching circuitry well known to those skilled in the art allows the output of the DC motor 130 to be alternatively manipulated by the operator with the use of a 10 k-ohm adjustable potentiometer. When the output of the DC motor 130 is manually adjusted with the use of the potentiometer, the output of the DC motor 130 remains at the manually prescribed angular velocity notwithstanding changes in ground speed. This arrangement provides maximum flexibility for the operator.

The DC motor 130, upon receipt as specified by the microprocessor 120 during the initialization of the apparatus, of the appropriate pulse width modulated signals, is interconnected to the metering drive shaft 92 with a gearing system, having a gear ratio as specified by the microprocessor 120 during an initialization step of the apparatus, as will be described in further detail herein. The motor utilized in the preferred embodiment is a 1/16 horsepower motor manufactured by Bison Gear and Engineering Corp.

A sensor (not shown) coupled with the metering drive shaft 92 provides a signal on a line 126 to the microprocessor 120 indicative of the angular velocity of the metering drive shaft 92. Of course, any number of sensors may be employed as will be known to those skilled in the art. In this way, the microprocessor 120 may provide appropriate compensation for any fluctuations in the output of the motor 130 as well as varying torque requirements for the metering drive shaft 92 on a continuous basis.

The microprocessor 120 also receives a signal on the line 124 indicative of the ground speed of the apparatus 10. From this information, compensation for varying ground speeds is also provided to the DC motor 130 for maintenance of the desired uniform output of granular material. For example, if the microprocessor 120 receives a signal on line 124 indicating an increased ground speed, control signals on line 134 for increasing the angular velocity of the DC motor 130 are provided. On the other hand, if the microprocessor 120 receives a signal indicative of decreased ground speed, control for decreasing the angular velocity of the DC motor 130 is provided. The microprocessor 120 also manipulates ground speed data and operating time of the system for computation of the total acreage covered and for providing an output to the display 106. In this way, such information is readily available to the operator.

An additional feature of the invention is that the microprocessor 120 provides appropriate signals to shutdown the metering and dispensing operations upon the sensing of a minimum threshold ground speed. This minimum threshold value may be entered via the keyboard 112. The provision of a minimum shutdown speed prevents dissemination of the granular material when the system approaches the end of the field. When the operator again increases the speed to its normal operating speed, upon completion of a turn or other activities, the microprocessor 120 provides the appropriate control signals to operate the motor 130 at its desired operating point.

The sequence of input signals received from the keyboard 112 is completely menu driven from the display 106. The display 106 comprises four rows of information, messages, and instructions for use of the system. For example, the microprocessor 120 provides signals to continuously improve the ground speed, total acreage traversed, application rate, and minimum shutdown speed on the display 106. In addition, an information line on the display 106 provides warning indicia and other information such as "system on", "system off", "low blower pressure", and the like. In this way, the operator is immediately aware of potential problems and system activity.

Figure 10:
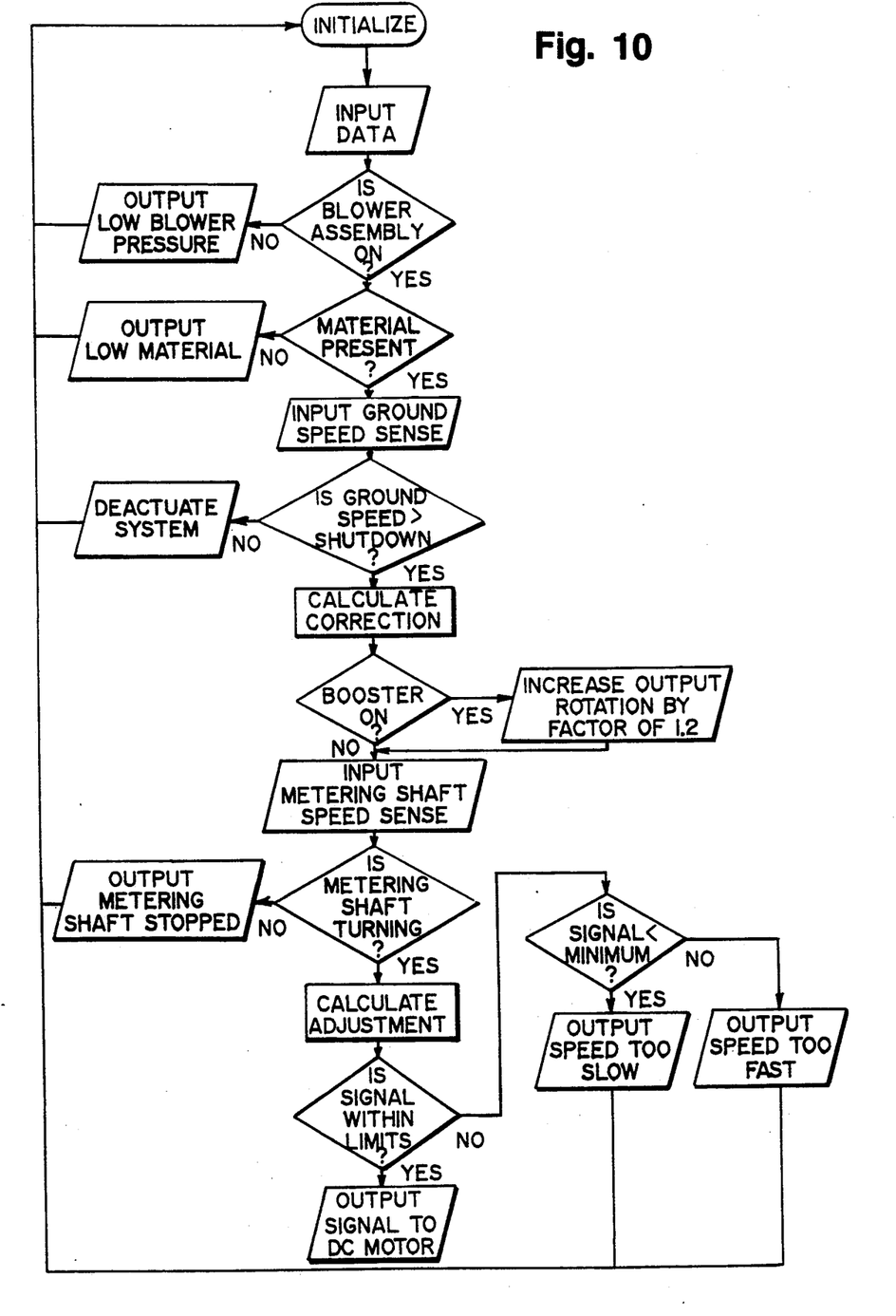
FIG. 10 is a flow chart of operation of the granular materials applicator according to the present invention.

FIG. 10 is a flowchart that summarizes the control operations of the present invention as described below. To commence operation of the system in an initializing step, the microprocessor 120 monitors the power sensing signal as well as the system power sensing signal provided on lines 140 and 142. If these signals are not present, an appropriate message is sent to the display 106 to indicate the absence of power. Thereafter, data corresponding to the rate of application of the granular material is input to the processor 120.

In addition, the microprocessor calculates the appropriate gear ratio interconnecting the DC motor 130 and the motor drive shaft 92. A message signal is sent to the display 106 to indicate the proper driving gears on the motor 130 or on the metering drive shaft 92.

The processor 120 also monitors the blower sensing on signal provided on the line 144 as well as the material sensing signal provided on the line 146. Similarly, a message signal is sent to the display 106 corresponding to the absence of these signals. When a booster request signal is provided on the line 148, an appropriate calculation for increasing the output of the DC motor by a ratio of 1.2 to 1 is made. In addition, the processor 120 responds to the ground speed signal on the line 124. Appropriate calculation for compensation of the ground speed is then provided. The processor 120 then compares the speed indicated by the ground speed signal to the minimum shut down speed. The ground speed must exceed the minimum shut down speed to continue operation of the system. Otherwise an appropriate message signal is sent to the display 106.

The processor 120 also monitors the angular velocity signal indicative of rotation of the metering drive shaft 92. If the drive shaft 92 has discontinued rotation, a warning alarm as well as an appropriate display is provided. Otherwise, the processor 120 adjusts the desired shaft speed.

The processor 120 thereafter compares the signal provided on the line 134 with a desired range of output signals corresponding to the operating limits of the system. Thereafter, an appropriate signal for driving the DC motor is sent on the line 134. Otherwise an indication that the signal is beyond the limits of the system is sent to the display 106.

Accordingly, the microprocessor 120 receives input information corresponding to the desired application rate of material, in pounds of material per acre, as well as the volumetric dimension of the metering roll pockets 90a through 90n. The microprocessor 120 also receives a sensing signal indicative of the ground speed of the system as well as a sensing signal indicative of the angular velocity of the DC motor 130 output, which drives the metering drive shaft 92. From this information, the processor 120 provides appropriate output signals to the DC motor 130 for rotation of the metering drive shaft 92 at a predetermined angular velocity, corresponding to the desired application rate.

In the preferred embodiment, the metering drive shaft 92 rotates each of sixteen metering rolls, such as metering roll 80 at a preselected angular velocity in the direction denoted by arrow 95. As the metering wheel 80 rotates, its respective pockets 90a through 90n pass relative the material feed chute as well as the hopper orifice 84. In this way, the pockets 90a through 90n are filled with material and then leveled with the leveling knife 94, extracting a known volumetric quantity from the hopper 12.

As the metering roll 80 continues its rotational path, gravitational forces act upon the material to supply the material to a material dispensing injector such as injector 64a, which is part of the pneumatic delivery system. As the material falls within the proximity of the delivery system, the induced vacuum uniformly draws the material through a nozzle-like outlet and throughout the delivery system hoses. It will be appreciated that a predetermined volume of material is thereby channelled to the air delivery system for appropriate dispensing.

According to the invention, any variation in ground speed or in the output of the DC motor 130 will provide an indication signal to the microprocessor 120 via the lines 124 and 126. From these signals, the microprocessor 120 supplies a compensating signal to the DC motor 130. Thus, for example, for increased ground speed, the DC motor will correspondingly increase its rotational speed for maintenance of a constant application rate.

From the description thus far provided, a granular materials dispensing apparatus that meets the aforestated objectives by providing a controlled volumetric metering system and uniform dispensing has been described. While a particular embodiment of the invention has been shown and described, it will be understood, of course, that the invention is not limited thereto, since modifications may be made and other embodiments of the principles of this invention will occur to those skilled in the art to which this invention pertains, particularly upon considering the foregoing teachings. For example, in any situation where granular material requires a controlled metering and uniform dispensing operation, the control system and dispensing theory utilized in this design may be used with appropriate modification. Other applications contemplated by this invention included metering and dispensing seed or metering and dispensing granular salt for inclement weather conditions. However, the apparatus and methods are preferably utilized in the advantageous assembly described herein. Accordingly, while the invention disclosed herein has been described with reference to the presently contemplated best mode for practicing the invention, it is intended that this invention be limited only by the scope of the appended

What is claimed is:

1. Apparatus for dispensing a predetermined quantity of granular material at a predetermined rate of application comprising:

support means;

a hopper attached to said support means for holding said granular material, said hopper having a base including an orifice for allowing the granular material to pass therethrough;

pneumatic delivery means spaced from and subtending said hopper for directing said granular material in a uniform distribution toward a dispensing location;

a metering system including a plurality of metering roll means rotatably mounted about a common axis of rotation and positioned between said hopper orifice and said pneumatic delivery means, each of said metering roll means having a plurality of spaced pockets about its circumference, said pockets being intermediate and spaced from each of the sides of the metering roll means, each of said pockets having a substantially cylindrical internal shape with a convex end defining a volume of preselected size relative to the concentration of the material to be dispensed, each of said pockets receiving said material and directing said material toward said pneumatic delivery means upon rotation of said metering roll means;

a plurality of segregated metering channels, each of said metering channels having an enclosed metering roll feed chute in communication with said hopper orifice and having a portion thereof defined by a cantilevered leveling knife, said leveling knife adjacent the circumference of a respective one of said metering rolls for removing excess material from said spaced pockets when said metering roll rotates about its axis of rotation;

metering drive means for rotating said metering roll means at a preselected angular velocity; and control means for determining said predetermined rate of application and driving said metering drive means at said preselected angular velocity.

2. The apparatus of claim 1 further comprising:
   transport means secured to said support means for enabling movement of said apparatus over an area intended for application of granular material.

3. The apparatus of claim 2 further comprising:
   ground speed sensing means for detecting the speed of said apparatus and for providing a signal indicative of the ground speed to said control means.

4. The apparatus of claim 3, wherein said control means further includes calculating responsive to said ground speed signal for determining the ground speed of said apparatus and the distance travelled by said apparatus; and
   display means responsive to said calculating means for displaying the ground speed and total distance travelled.

5. The apparatus of claim 4, wherein said control means further comprises:
   input means for selecting a desired application rate and for selecting a known density of material to be applied; and
   means for determining, in response to said input means and to said ground speed signal, a volume of granular material related to said application rate and said known density of granular material and for providing a signal to said metering drive means.

6. The apparatus of claim 1 wherein said metering system further comprises:
   a plurality of V-shaped inlet ports for providing the granular material to said pneumatic delivery means, each of said inlet ports spaced from a respective one of said metering rolls and in communication with a pressurized air stream supplied by said pneumatic delivery means, said air stream passing transverse said inlet ports to receive the granular material deposited by said spaced pockets when said metering roll rotates about its axis of rotation.

7. The apparatus of claim 6 wherein said pneumatic delivery means further comprises:
   a blower assembly for providing a pressurized air stream outlet;
   a manifold in communication with said pressurized air stream outlet having a plurality of air stream channels, each of said air stream channels providing said pressurized air stream passing transverse a respective one of said inlet ports; and
   a plurality of delivery channels in communication with said air stream channels and terminating at preselected locations for dispensing, said delivery channels uniformly dispensing said granular material supplied to said inlet ports.

* * * * *